US012725002B2

(12) United States Patent
Deng et al.

(10) Patent No.: US 12,725,002 B2
(45) Date of Patent: Sep. 1, 2026

(54) RFID TRANSPONDER, A POD AND A METHOD FOR MANUFACTURING THE POD

(71) Applicant: Confidex Oy, Tampere (FI)

(72) Inventors: Will Deng, Tampere (FI); Miika Pylvänäinen, Tampere (FI)

(73) Assignee: Confidex Oy, Tampere (FI)

( * ) Notice: Subject to any disclaimer, the term of this patent is extended or adjusted under 35 U.S.C. 154(b) by 0 days.

(21) Appl. No.: 18/862,878

(22) PCT Filed: Oct. 26, 2022

(86) PCT No.: PCT/CN2022/127625
§ 371 (c)(1),
(2) Date: Nov. 4, 2024

(87) PCT Pub. No.: WO2023/213059
PCT Pub. Date: Nov. 9, 2023

(65) Prior Publication Data

US 2025/0284920 A1 Sep. 11, 2025

(30) Foreign Application Priority Data

May 5, 2022 (WO) ................ PCT/CN2022/090966

(51) Int. Cl.
*G06K 19/077* (2006.01)
*H01Q 1/22* (2006.01)
*H01Q 1/36* (2006.01)
*H01Q 9/04* (2006.01)

(52) U.S. Cl.
CPC ..... *G06K 19/07777* (2013.01); *H01Q 1/2208* (2013.01); *H01Q 1/2283* (2013.01); *H01Q 1/362* (2013.01); *H01Q 9/0414* (2013.01)

(58) Field of Classification Search
CPC ........... G06K 19/07777; H01Q 1/2283; H01Q 1/362; H01Q 9/0414; H01Q 1/2208
USPC .......................................................... 235/492
See application file for complete search history.

(56) References Cited

U.S. PATENT DOCUMENTS 10,339,435 B2 * 7/2019 Destraves ................ H04B 1/24
2007/0001809 A1 1/2007 Kodukula
2008/0136732 A1 6/2008 Oconnell
2013/0299597 A1 * 11/2013 Sinnett ............. G06K 19/07749 29/601
2018/0174015 A1 6/2018 Destraves
(Continued)

FOREIGN PATENT DOCUMENTS

CN 101702945 A 5/2010
CN 103022644 A 4/2013
CN 112151962 A 12/2020
(Continued)

OTHER PUBLICATIONS

Oct. 16, 2025 Office Action issued in Japanese Patent Application No. 2025-511984, pp. 1-6.
(Continued)

*Primary Examiner* — Michael G Lee
*Assistant Examiner* — David Tardif
(74) *Attorney, Agent, or Firm* — Nixon & Vanderhye PC

(57) ABSTRACT

An RFID transponder (1) comprising a radiating antenna (2) and a pod (3) and a method for manufacturing a panel (29) comprising pods (3) are disclosed.

13 Claims, 10 Drawing Sheets

(56) References Cited

U.S. PATENT DOCUMENTS

2019/0266468 A1* 8/2019 Kato ...................... H01Q 1/273
2019/0341673 A1* 11/2019 Destraves ............ H01Q 1/2241

FOREIGN PATENT DOCUMENTS

| | | |
|---|---|---|
| JP | 2004-172342 | 6/2004 |
| JP | 2008-148289 | 6/2008 |
| JP | 2009-284476 | 12/2009 |
| JP | 2019/146237 | 8/2019 |
| WO | 2018/101315 | 6/2018 |
| WO | 2019/146237 | 8/2019 |
| WO | 2021/058904 | 4/2021 |
| WO | 2021058903 A1 | 4/2021 |

OTHER PUBLICATIONS

International Search Report and Written Opinion of the ISA for PCT/CN2022/127625, mailed Jan. 19, 2023, 9 pages.
International Search Report and Written Opinion of the ISA for PCT/CN2021/092370, mailed Jan. 25, 2022, 11 pages.
International Search Report and Written Opinion of the ISA for PCT/CN2022/090966, mailed Jul. 28, 2022, 11 pages.
Dec. 5, 2025 Search Report issued in European Patent Application No. 22940753.1, pp. 1-12.
Apr. 20, 2026 Office Action issued in Japanese Patent Application No. 2025-511984, pp. 1-4 [English translation included].

* cited by examiner

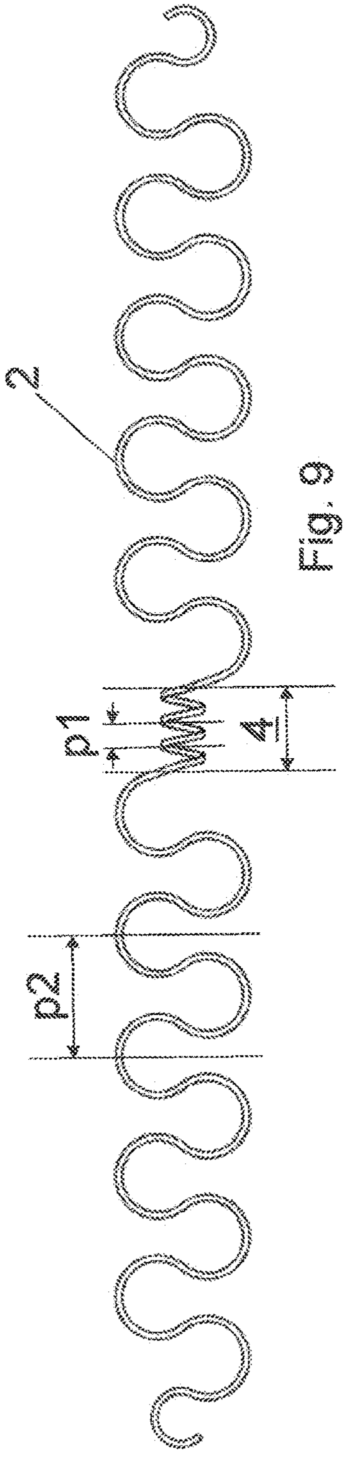
Fig. 9
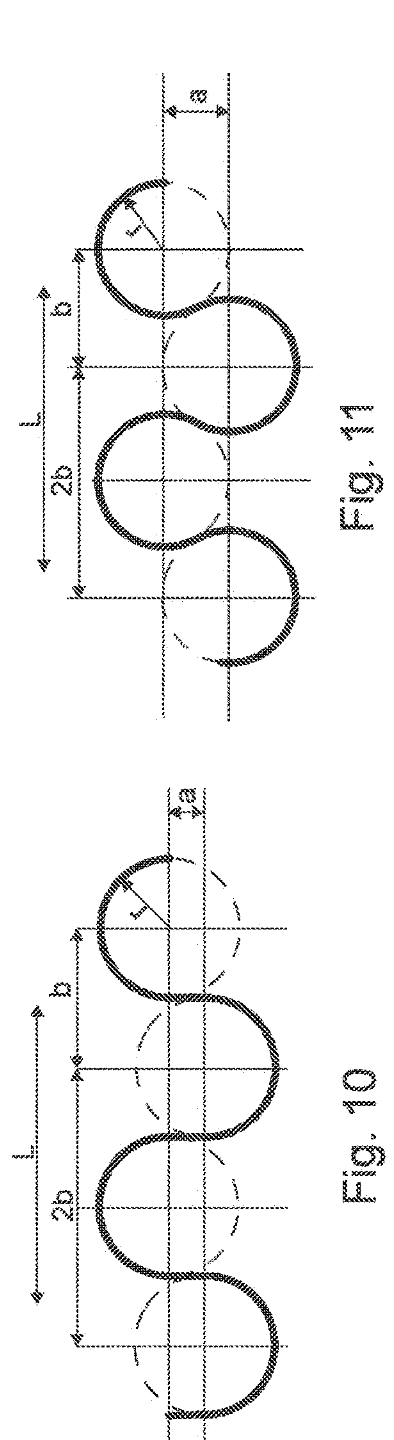
Fig. 10
Fig. 11

RFID TRANSPONDER, A POD AND A METHOD FOR MANUFACTURING THE POD

CROSS-REFERENCE TO RELATED APPLICATIONS

This application is the U.S. national phase of International Application No. PCT/CN2022/127625 filed Oct. 26, 2022, which designated the U.S. and claims priority to International Application No. PCT/CN2022/090966 filed May 5, 2022, the entire contents of each of which are hereby incorporated by reference.

FIELD OF THE INVENTION

The present invention relates to an RFID transponder (radio frequency identification transponder), a pod for an RFID transponder and a method for manufacturing the pod.

BACKGROUND OF THE INVENTION

RFID transponders are known. One of the disadvantages associated with the known transponders is that they are not easily adapted to mass production because of their complex structure.

US 2019/341673 discloses a radiofrequency communication module for a tire. The radiofrequency communication module includes a radiofrequency transponder that has an electronic portion. The electronic portion comprises an electronic chip and a primary antenna that is electrically connected to the electronic chip via a printed circuit board. The primary antenna consists of a surface-mount-device (SMD) microcoil. There are copper tracks terminated by copper pads on the printed circuit board. The primary antenna is connected to the copper pads on one end of the copper tracks and the electronic chip is connected to the copper pads via gold wires on another end of the copper tracks. The electronic chip is placed on the printed circuit board.

BRIEF DESCRIPTION OF THE INVENTION

An object of the present invention is to provide an RFID transponder, a pod and a manufacturing method so as to solve the above problem. The objects of the invention are achieved by the RFID transponder, the pod and the manufacturing method which are characterized by what is stated in the independent claims. The preferred embodiments of the invention are disclosed in the dependent claims.

An advantage of the RFID transponder is that it may be mass produced and it is still of high quality and very reliable.

Still another advantage is that the RFID transponder may have a small size that is suitable e.g. for smaller tyres or other substantially thin products.

Still another advantage is that the read range performance is more consistent.

The RFID transponder may be used in tyres but also other applications are possible, such as products that comprise moulded parts. The RFID transponder may be embedded inside the moulded part, such as plastic containers, equipment for information technology, car parts, toys, or healthcare equipment. In other words, the RFID transponder described in this text may be applied in every use where it is desired to have the transponder inside a product instead of adding the transponder on the surface of the product after manufacturing it. However, the transponder is especially suitable for tyres.

In tyres the RFID transponder is embedded in an elastomeric material of a tyre in order to save readable information inside a tyre. The RFID transponder can be applied to any kind of tyres including tyres of a passenger car which is the most demanding target due to a substantially thin elastomeric material layer in the tyre. The total thickness of the RFID transponder in a tyre of a passenger car should not exceed a thickness that is of the order of 1.5 mm. The RFID transponder has to withstand harsh manufacturing conditions of a tyre. The manufacturing process includes a vulcanization step that takes place at a high temperature and high pressure. The RFID transponder must also withstand a use of the tyre throughout its whole life cycle. The RFID transponder must not have an effect on the durability of the tyre.

The RFID transponder comprises a radiating antenna that may be a dipole antenna and a pod. The radiating antenna may be a three-dimensional helical antenna or a folded planar antenna. The folded planar antenna has an advantage that it can be deformed in the structure of the tyre without having an impact on the performance of the antenna. The radiating antenna may also be a monopole antenna or a patch antenna.

The radiating antenna has a coupling area for the pod. The pod is situated at the coupling area, usually inside the coupling area. There may be a retainer in the pod and/or radiating antenna in order to keep the pod in place. The coupling area is helical in both above-mentioned antenna types. The coupling area may be situated anywhere in the radiating antenna. For example, the coupling area may be situated in the middle of the antenna, or at one end of the antenna. The coupling area has a pitch size that can be tuned in order to tune the impedance matching between the pod and the radiating antenna. The radiating antenna outside the coupling area has another pitch size that can be adjusted in order to adjust the resonant frequency of the antenna so that it works in a desired frequency range. The frequency range may be inside the UHF (ultra high frequency) range, i.e. between 860 MHz to 960 MHz. The range may also be in the HF (high frequency) range, such as 13.56 MHz.

The pod comprises a first end and a second end and the casing between the first end and the second end. The casing has a central longitudinal axis. The casing is a layered structure. The cross-section of the casing may be a rectangle, for example. At least part of the casing is of dielectric material in such a manner that electrically conductive parts are electrically isolated from each other where required. The material of the casing may also be throughout dielectric.

A planar helix antenna forming a helical primary antenna resides in the casing. The planar helix antenna has a first antenna end and a second antenna end. The first antenna end is connected to a second electrically conductive connection. The second antenna end is connected to a third electrically conductive connection. The third electrically conductive connection is connected to a first electrically conductive connection.

An integrated circuit on a chip is coupled to the first electrically conductive connection and the second electrically conductive connection. The techniques, which are used for attaching the chip, may be direct soldering, wire bonding or flip-chip soldering.

According to a first alternative, the second antenna end and/or the third electrically conductive connection is connected to the first electrically conductive connection through a lead-through or the first antenna end is connected to the second electrically conductive connection through a lead-through. The lead-through may be an electrically conductive bridge. It may be formed by printing or etching.

The first and second electrically conductive connections and the lead-through lie on one of the dielectric layers. It means that they are inside a sandwich structure formed by the dielectric layers and they have to be exposed before attaching the chip. The first, second and third electrically conductive connections may be integral parts of the antenna.

According to a second alternative, there are two lead-throughs. A first lead-through extends from the second antenna end and/or the third electrically conductive connection to a first electrically conductive connection thus electrically connecting the first electrically conductive connection and the second antenna end. A second lead-through extends from the first antenna end to a second electrically conductive connection thus electrically connecting the second electrically conductive connection and the first antenna end. An integrated circuit on a chip is coupled to the first electrically conductive connection and the second electrically conductive connection.

Both lead-throughs and the first and second electrically conductive connections lie on one of the dielectric layers. It means that they are inside a sandwich structure formed by the dielectric layers and they have to be exposed before attaching the chip. The first, second and third electrically conductive connections may be integral parts of the antenna. Except that there are two lead-throughs the second alternative may be similar to the first alternative.

The pod according to the first and second alternatives comprise the integrated circuit inside the pod. In order to expose the electrically conductive contacts a cavity is formed in the layers above the first and second electrically conductive contacts. The cavity may be formed e.g. by cutting or drilling an individual layer of the pod before attaching it to other layers. The cavity may be e.g. cylindrical, cubical or any other shape that is useful for revealing the electrically conductive contacts. The integrated circuit is connected to the electrically conductive contacts. Thereafter the cavity may be filled by a dielectric material, such as epoxy resin. The cavity may also be unfilled. By laying the integrated circuit in the cavity the height of the pod is reduced and the integrated circuit is protected against outer impacts.

According to the third alternative, the first end of the casing comprises a first electrically conductive connection and a second electrically conductive connection. The second end of the casing may comprise a third electrically conductive connection. The third electrically conductive connection may be on the second end of the casing or at a close proximity of the second end inside the casing. The first, second and third electrically conductive connections may be integral parts of the antenna. Except that the first and second electrically conductive connections are on the first end the third alternative may be similar to the first alternative.

The casing according to the first, second and third alternatives comprises layers of dielectric material, such as ceramic material that resists high temperatures well. Further, the ceramic materials make it possible to reduce the size of the pod and have a better performance. Preferred ceramic materials are those whose dielectric constant is from 7.0 to 8.0 and dielectric loss angle from 0.004 to 0.006 but also other ceramic materials are usable. In addition to the above-mentioned materials also typical printed circuit board materials, such as FR4, or plastic films may be used for forming the layered structure. The layers may be adhesively attached.

The casing comprises at least two layers. The casing may comprise three layers, namely a first layer and a third layer and a second layer between the first layer and the third layer. Each layer may be a planar layer having a substantially constant thickness. The thickness may vary in different layers. Besides the above-mentioned layers there may be more layers. Additional layers may be required e.g. for electrical isolation or for shielding the first layer and/or the third layer.

The casing comprises a first row of sequential first via holes that may extend from the first layer to the third layer. The first via holes have first ends and second ends. The casing also comprises a second row of sequential second via holes that may extend from the first layer to the third layer. The second via holes have first ends and second ends. The via holes in the second row are at different points in the longitudinal direction of the casing compared to the via holes in the first row.

Sequential upper arms connect the first ends of the first via holes to the first ends of the second via holes and sequential lower arms connect the second ends of the first via holes and the second ends of the second via holes. The arms and the via holes are electrically conductive.

In connection with the first and second alternatives explained above the electrically conductive parts of the pod are preferably totally inside the dielectric material, such as ceramic material, so that there may not be a need to use an additional non-conductive coating. This is important is regard to a cost-effective manufacture. If the dielectric material is an ordinary printed circuit board a non-conductive coating may be required.

The radiating antenna and the primary antenna are configured to couple without a physical contact. It means that the radiating antenna and the primary antenna are configured to couple either inductively or capacitively. The inductive coupling is preferred.

As the radiating antenna and the primary antenna should not be in a galvanic contact with each other there may be a dielectric layer between them. The outer surface of the pod and the primary antenna may be covered with a dielectric layer, or the inner surface of the radiating antenna may be electrically isolated.

The pod may also be manufactured of two layers. The second layer may be omitted if the lead-through is on the third layer. The lead-through may be formed on the third layer between the via holes. The lead-through shall be electrically isolated from the via holes. The above-mentioned option may also comprise additional layers, such as a layer above the first layer, or a layer under the third layer.

The RFID transponder may be embedded in a product, such as a tyre or another product. The RFID transponder may be added in e.g. rubber or plastic. The integrated circuit on the chip may contain information about e.g. the manufacturer of the product or information related to the product, i.e. identification information has been stored in the integrated circuit on the chip. An RFID reader may energize the RFID transponder and thus the information may be read.

One possibility to manufacture the pod according to the first and second alternatives is as follows: The primary antenna may be manufactured by using Low Temperature Co-fired Ceramic (LTCC) Technology. Blanks of layers comprising ceramic particles mixed with polymer binders are formed. The blanks are punched in order to form via holes. The via holes are made electrically conductive e.g. by electroplating them with an electrically conductive material. The arms and the lead-through may formed by printing. In order to expose the electrically conductive contacts a cavity is formed in the layers above the first and second electrically conductive contacts. The cavity may be formed e.g. by cutting or drilling an individual layer of the pod before attaching it to other layers. The cavity may be e.g. cylindrical, cubical or any other shape that is useful for revealing the electrically conductive contacts. Thereafter the layers are laminated together and fired at a temperature that is below 1000° C. in such a manner that the polymer binders burn and the ceramic particles sinter together. The integrated circuit is connected to the electrically conductive contacts. Thereafter the cavity may be filled by a dielectric material, such as epoxy resin. The cavity may also be unfilled. By laying the integrated circuit in the cavity the height of the pod is reduced.

When the first and second electrically conductive contacts lie on one of the dielectric layers it is possible to manufacture parallel and/or sequential pods, e.g. 500 pods at a time. Multiple pods are first manufactured as a panel and thereafter the pods are cut off from the panel to form individual pods. The above-mentioned production method enhances manufacturing accuracy, yield and capacity.

Another possibility to manufacture the pod according to the first and second alternatives is to use a printed circuit (PCB) core and a prepreg as first and second dielectric layers. The PCB core has upper and lower surfaces. The prepreg has upper and lower surfaces.

The dielectric PCB core has an electrically conductive layer on both sides. The electrically conductive layers may be of copper. A photoresist dry film comprising a circuit pattern is laminated by heat on both electrically conductive layers. The film is thereafter removed but the circuit pattern remains on the electrically conductive layer, i.e. the circuit pattern on the upper surface of the first layer comprises a pattern for the upper arms and the circuit pattern on the lower surface of the first layer comprises a pattern for the lead-through. The electrically conductive layers are etched so that only the circuit pattern remains on the upper and lower surfaces. A cavity is formed by drilling a hole to the PCB core. The cavity exposes the first electrically conductive connection and the second electrically conductive connection so that the chip can be attached.

The prepreg is laminated to the PCB core in such a manner that the lower surface of the first layer and the upper surface of the second layer contact. A foil of electrically conductive material, such as copper, is laminated to the lower surface of the prepreg.

Thereafter the via holes are formed. The via holes are plated in order to make them electrically conductive.

A photoresist dry film comprising a circuit pattern is laminated by heat on the lower surface of the prepreg. The film is thereafter removed but the circuit pattern remains on the electrically conductive foil, i.e. the circuit pattern on the lower surface of the second layer comprises a pattern for the lower arms. The electrically conductive foil is etched so that only the circuit pattern remains on the lower surface. A layer of a solder mask is applied on the upper surface of the first layer and the lower surface of the second layer in order to protect the upper and the lower surface of the pod.

The integrated circuit on the chip is fixed in the cavity. The first electrically conductive connection and the second electrically conductive connection are connected to respective pads of the chip. Thereafter the cavity may be filled with a resin, such as epoxy, that protects the chip 15.

Still another possibility to manufacture the pod according to the first and second alternatives is to attach the integrated circuit on one of the layers and connect it to the first and second electrically conductive contacts and thereafter laminate said layer with other layers so that the integrated circuit is embedded inside the pod. Then there is no need for a cavity. In other words, the manufacturing process is the same as with the cavity except that the cavity is omitted and the integrated circuit is attached before the laminating step. The layers may be made of printed circuit board material, such as FR4.

One possibility to manufacture the pod according to the third alternative is as follows: The primary antenna may be manufactured by using Low Temperature Co-fired Ceramic (LTCC) Technology. Blanks of layers comprising ceramic particles mixed with polymer binders are formed. The blanks are punched in order to form via holes. The via holes are made electrically conductive by filling them with an electrically conductive material. The arms and the lead-through may be formed by printing. Thereafter the layers are laminated together and fired at a temperature that is below 1000° C. in such a manner that the polymer binders burn and the ceramic particles sinter together. The first electrically conductive connection and the second electrically conductive connection are on the one end of the pod. The integrated circuit is connected to the first and second electrically conductive connections.

BRIEF DESCRIPTION OF THE DRAWINGS

In the following the invention will be described in greater detail by means of preferred embodiments with reference to the attached drawings, in which

FIG. 6 shows a schematic view of a primary antenna and a lead-through;

FIG. 9 shows a side view of a radiating antenna;

FIGS. 10 and 11 show a principle of the antenna of FIG. 9;

DETAILED DESCRIPTION OF THE INVENTION

Figure 1:
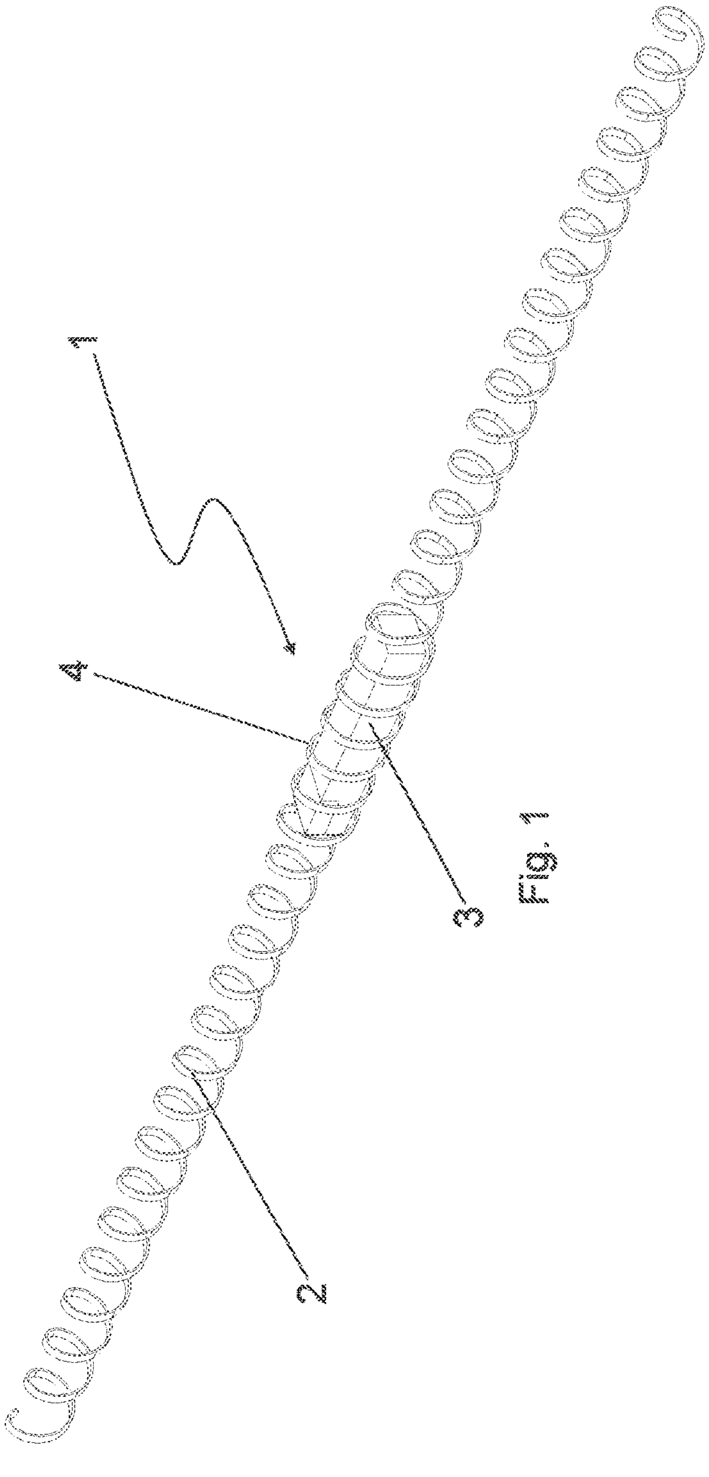
FIG. 1 shows a perspective view of an RFID transponder.

FIG. 1 shows a perspective view of an RFID transponder 1. The RFID transponder 1 comprises a radiating antenna 2 and a pod 3. The radiating antenna 2 may be a helical dipole antenna that is shown in FIG. 1. The radiating antenna 2 has a coupling area 4 for the pod 3. The coupling area 4 comprises helices.

Figure 2:
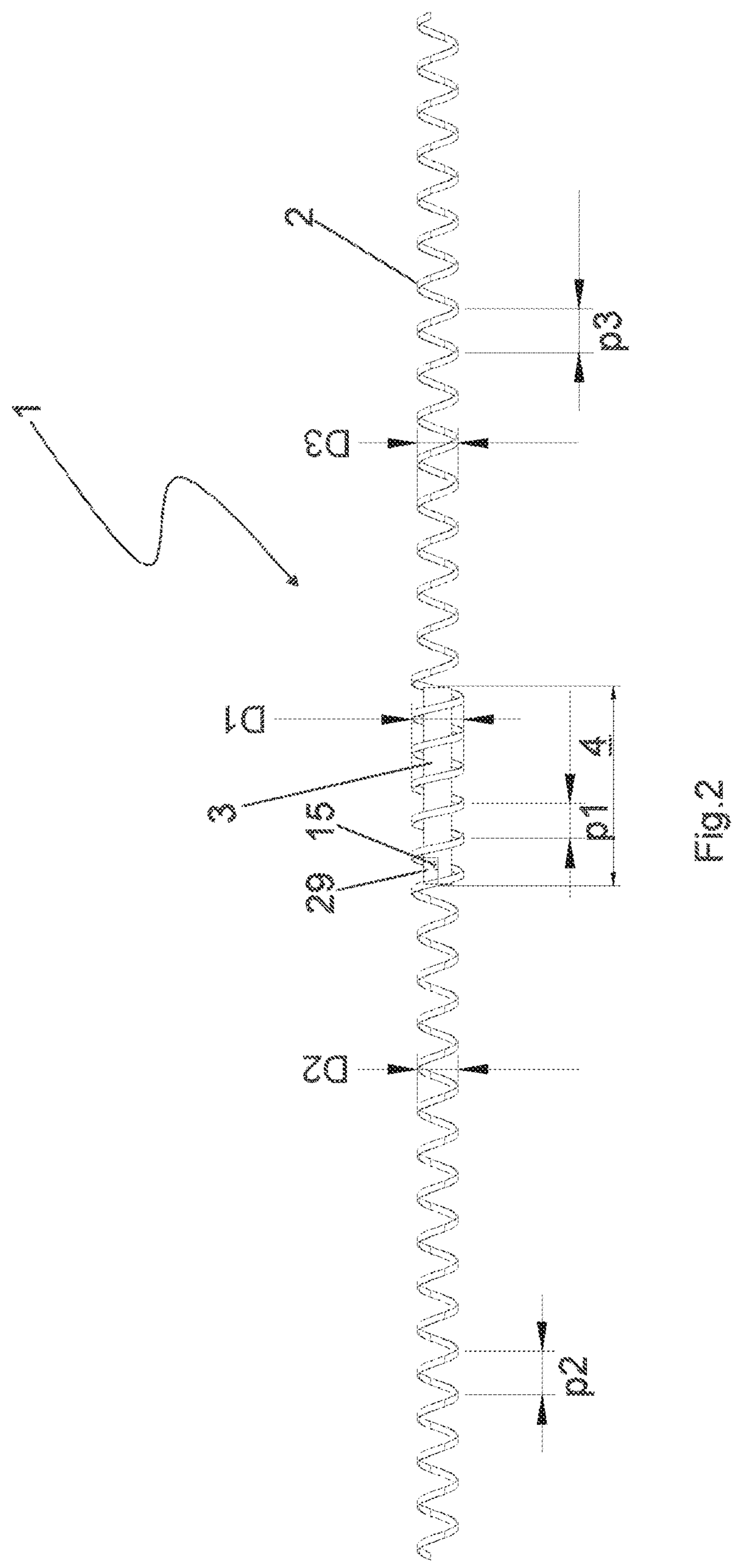
FIG. 2 shows a side view of an RFID transponder.

FIG. 2 shows a side view of an RFID transponder 1 that may be similar to the RFID transponder of FIG. 1. The RFID transponder 1 comprises a radiating antenna 2 and a pod 3. The coupling area 4 comprises helices and has a pitch p1. The radiating antenna 2 outside the coupling area 4 comprises helices and has a pitch p2 or a pitch p3. The pitches p1, p2 and p3 may be equal or different from each other. The helices have outer diameters D1, D2 and D3 that may be equal or different from each other. Usually D1 is slightly larger than D3 and D3 and D2 are equal.

Figure 3:
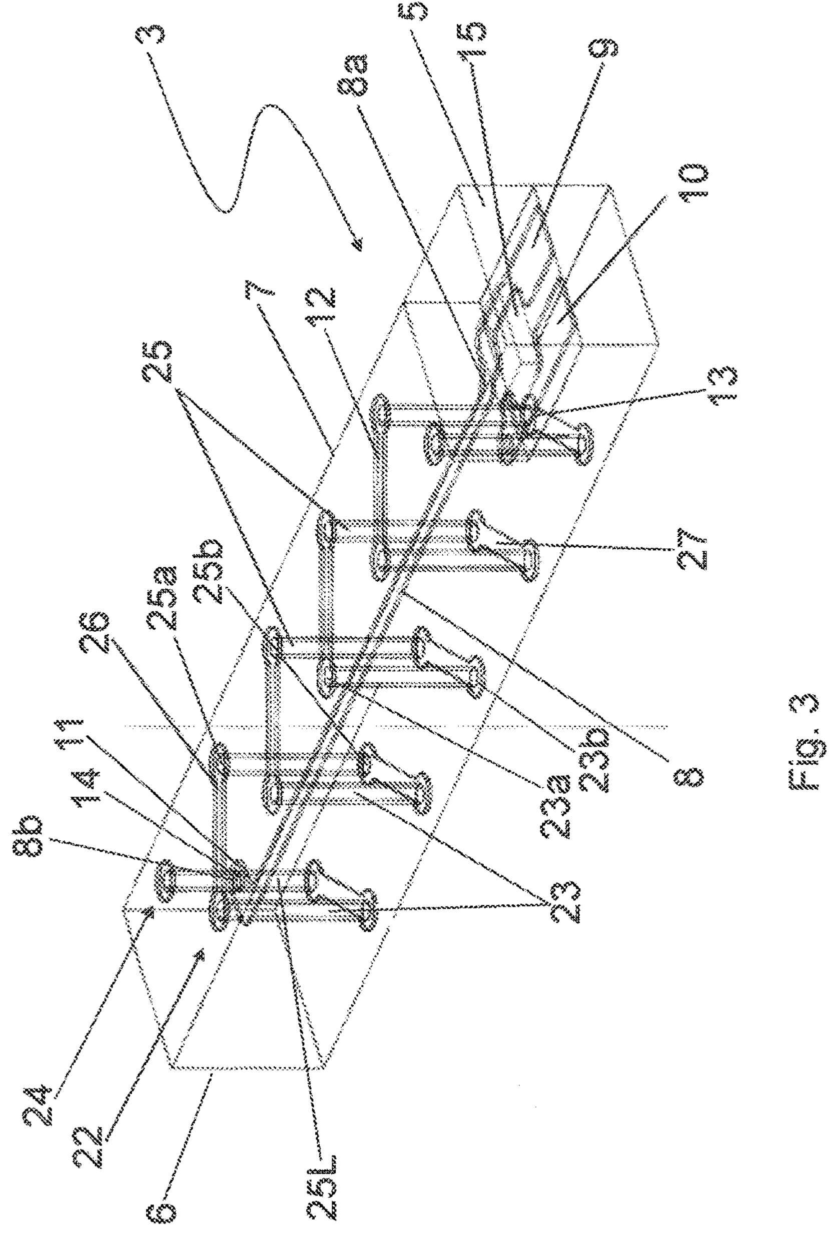
FIG. 3 shows a perspective view of a pod.
Figures 4, 5:
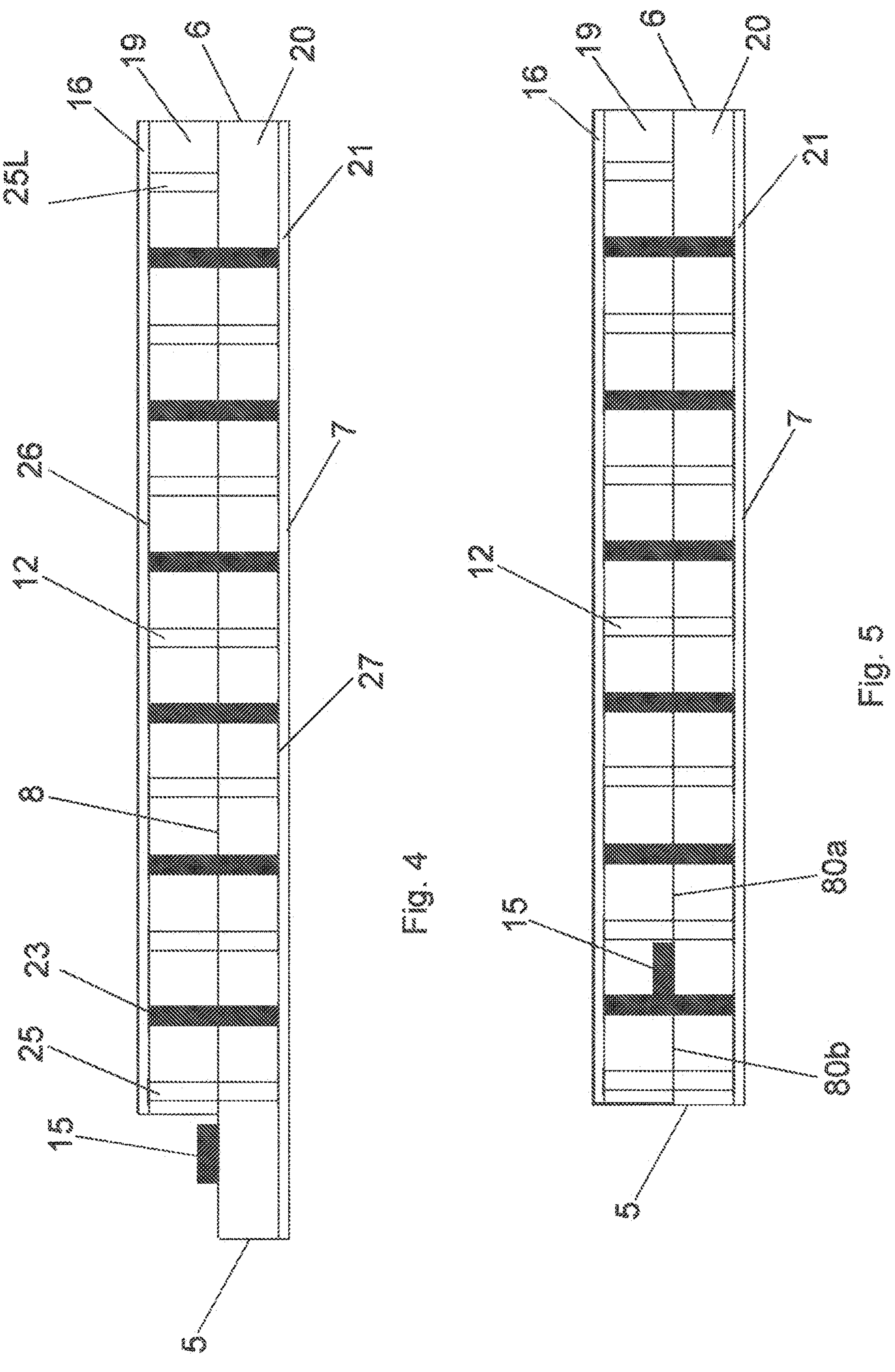
FIG. 4 shows a side view of a pod.
FIG. 5 shows a side view of another pod.

FIGS. 3 and 4 show a pod 3. The pod 3 comprises a first end 5 and a second end 6 and a casing 7 having a layered structure between the first end 5 and the second end 6. At least part of the casing 7 is of dielectric material.

The casing 7 comprises layers of dielectric material, such as ceramic material. The casing comprises a first layer 19 and a third layer 21 and a second layer 20 between the first layer 19 and the third layer 21. Each layer may be a planar layer having a substantially constant thickness. The thickness may vary in different layers. Besides the above-mentioned layers there may be more layers. There may be at least one ceramic layer between the first and the second layer, and/or between the second and the third layer. There may also be at least one ceramic layer upon the first layer 19 and/or below the third layer 21. FIGS. 4 and 5 show a ceramic layer 16 on the first layer 19.

The layered structure comprises a lead-through 8 between the first end 5 and the second end 6. The lead-through 8 may be a printed lead or another electrically conductive bridge. The lead-through is formed on one of the layers. The lead-through may be formed on the second layer 20. A first electrically conductive connection 9 and a second electrically conductive connection 10 lie on one of the dielectric layers, such as the second layer 20 shown in FIGS. 4 and 5.

A planar helix antenna forming a helical primary antenna 12 resides in the casing 7. The helical primary antenna 12 has a first antenna end 13 and a second antenna end 14. A third electrically conductive connection 11 is configured to extend from the second antenna end 14. The first antenna end 13 is connected to the second electrically conductive connection 10. The second antenna end 14 is connected to the third electrically conductive connection 11. The third electrically conductive connection 11 is connected to the first electrically conductive connection 9 through the lead-through 8. An integrated circuit on a chip 15 is coupled to the first electrically conductive connection 9 and the second electrically conductive connection 10. The techniques, which are used for attaching the chip 15, may be direct soldering, wire bonding or flip-chip soldering.

The casing comprises a first row 22 of sequential first via holes 23 that extend from the first layer 19 to the third layer 21. The first via holes 23 have first ends 23*a* and second ends 23*b*. The casing 7 also comprises a second row 24 of sequential second via holes 25 that extend from the first layer 19 to the third layer 21. The second via holes 25 have first ends 25*a* and second ends 25*b*. The via holes 25 in the second row 24 are at different points in the longitudinal direction of the casing 7 compared to the via holes 23 in the first row 22.

Sequential upper arms 26 connect the first ends 23*a* of the first via holes 23 to the first ends 25*a* of the second via holes 25 and sequential lower arms 27 connect the second ends 23*b* of the first via holes 23 and the second ends 25*b* of the second via holes 25. The arms 26, 27 and the via holes 23, 25 are electrically conductive. The arms 26, 27 extend diagonally in respect of the longitudinal direction of the pod. The arms 26, 27 cross in a projection perpendicular to the plane of the layers 19, 20, 21. The arms 26, 27 may be perpendicular to each other in the projection.

The last via hole 25L in the longitudinal direction D of the casing 7, which may be in either row 22, 24, extends from the first layer 19 to the second layer 20. The second end 25Lb of the last via hole 25L and the second end 8*b* of the lead-through 8 form the third electrically conductive connection 11. The first electrically conductive connection 9 extends from the first end 8*a* of the lead-through 8 on the surface of the second layer 20. The second electrically conductive connection 10 extends from the first end 23*a* of the first via hole 23 on the surface of the second layer 20.

Thus, the helical primary antenna, which is a planar helix antenna in this case, is formed as follows: There are the electrically conductive via holes 23, 25 and the electrically conductive arms 26, 27. The antenna extends repeating a sequence from the first end 25*a* of the via hole 25 to the second end 25*b* of the via hole 25, from the second end 25*b* of the via hole 25 to the arm 27, from the arm 27 to the second end 23*b* of the via hole 23, from the second end 23*b* of the via hole 23 to the first end 23*a* of the 23, from the first end 23*a* of the via hole 23 to the arm 26 and from the arm 26 to the first end 25*a* of the via hole 25. It is also possible that the sequence begins from the other row, i.e. the via hole 23 is the first in the sequence.

The arms 26 may be formed on the front side of the first layer 19 and the arms 27 may be formed on the front side of the third layer 21. The via holes 23, 25, which extend through the first layer 19 and the second layer 20, connect the arms 26 on the first layer 21 and the arms 27 on the third layer 21.

Figures 8A, 8B, 8C:
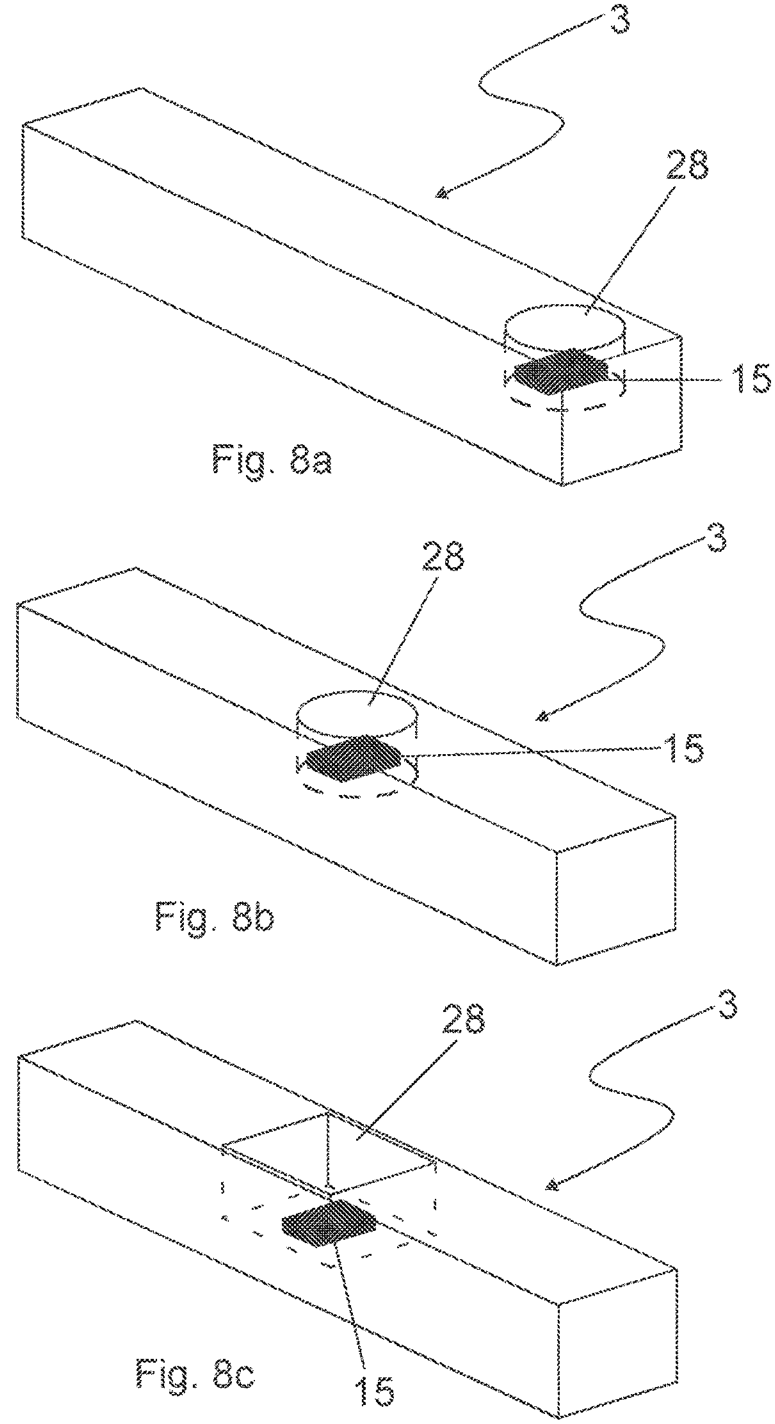
FIGS. 8*a* to 8*c* show a perspective views of pods.

The layers above the second layer 20, namely layers 19 and 16 in FIG. 4, are removed in order to expose the first electrically conductive connection 9 and the second electrically conductive connection 10. A cavity 28 may be formed as shown in FIGS. 8*a* to 8*c*. After the connections 9, 10 have been exposed the integrated circuit on a chip (IC) 15 is coupled to the first electrically conductive connection 9 and the second electrically conductive connection 10. One suitable material for the antenna and the electrically conductive connections is silver. The electrically conductive connections may be electroplated with tin or other suitable material. The cavity 28 may be filled with epoxy but it may not be necessary in every case.

The structure of the pod 3 may vary in respect of the order of the layers 19, 20, 21, i.e. the layers 19, 20, 21 may swap places. The second layer 20 may not include the lead-through 8. The lead-through 8 may be above the first layer 19, or under the third layer 21. Naturally, the electrically conductive connections 9, 10, 11 shall be redeployed in those cases. For example, the last via hole 25L may extend through the third layer 21 to the layer under the third layer 21 where the lead-through 8 extends. It is also possible that the second layer 20 is omitted. However, the second layer 20 between the first layer 19 and the third layer 21 is preferred in order to achieve the best inductance (coupling performance) to the radiating antenna 2.

The pod 3 may also be manufactured of two layers 19, 21. The second layer 20 may be omitted if the lead-through 8 is on the third layer 21. The lead-through 8 may be formed on the third layer between the via holes 23, 25. The lead-through 8 shall be electrically isolated from the via holes 23, 25. The above-mentioned option may also comprise at least one additional layer, such as a layer above the first layer 19, or a layer under the third layer 21.

The two-layer structure may also be as follows: The second layer 20 is omitted. The upper arms 26 may be formed on the front side of the first layer 19 and the lower arms 27 may be formed on the back side of the third layer 21. The lead-through 8 may be formed on the front side of the third layer 21. The via holes 23, 25 extend through the layers 19, 21 thus electrically connecting the arms 26, 27.

The shape of the pod 3 may be a rectangular prism. The rectangular prism may have a square cross-section perpendicular to its longitudinal axis, i.e. its side lengths in the height and depth direction are equal.

FIG. 5 shows a side view of another pod 3. The pod 3 has the same structure as in FIG. 4 with the exception of the lead-through 8. The pod 3 shown in FIG. 5 comprises a first lead-through 80*a* that connects the first electrically conductive connection 9 and the third electrically conductive connection 11 and a second lead-through 80*b* that begins from the first antenna end 13 and continues to the second electrically conductive connection 10. Thus, there are two lead-throughs 80*a*, 80*b* that make possible to transfer the electrically conductive connections 9, 10 along the second layer wherever desired.

Figure 6:
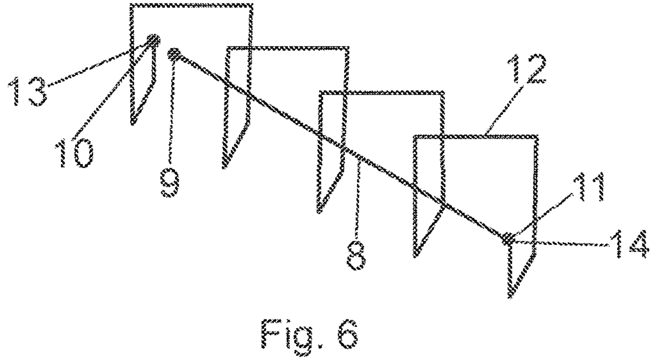

FIG. 6 shows a schematic view of a primary antenna 12 with one lead-through 8. The structure in FIG. 6 corresponds to the structures shown in FIGS. 3 and 4. The primary antenna has a first antenna end 13 and a second antenna end 14. A second electrically conductive connection 10 is in electrical contact with the first antenna end 13. A lead-through 8 extends from the second antenna end 14 to a first electrically conductive connection 9 thus electrically connecting the first electrically conductive connection 9 and the second antenna end 14. The lead-through 8 and the first and second electrically conductive connections 9, 10 lie on one of the dielectric layers, such as the second layer 20 shown in FIG. 4. An integrated circuit 15 on a chip is due to be connected to the first and second electrically conductive connections 9, 10.

Figure 7:
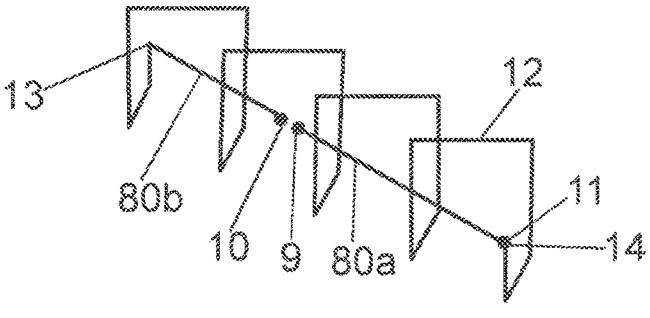
FIG. 7 shows a schematic view of a primary antenna and two lead-throughs.

FIG. 7 shows a schematic view of the primary antenna 12 with two lead-throughs 80*a*, 80*b*. The structure in FIG. 7 corresponds to the structure shown in FIG. 5. The primary antenna has a first antenna end 13 and a second antenna end 14. A first lead-through 80*a* extends from the second antenna end 14 to a first electrically conductive connection 9 thus electrically connecting the first electrically conductive connection 9 and the second antenna end 14. A second lead-through 80*b* extends from the first antenna end 13 to a second electrically conductive connection 10 thus electrically connecting the second electrically conductive connection 10 and the first antenna end 13. Both lead-throughs 80*a*, 80*b* and the first and second electrically conductive connections 9, 10 lie on one of the dielectric layers, such as the second layer 20 shown in FIG. 5. An integrated circuit 15 on a chip is due to be connected to the first and second electrically conductive connections 9, 10.

FIG. 8 shows perspective schematic views of pods 3. FIG. 8*a* shows a pod 3 that comprises an integrated circuit near the end of the pod 3. A cylindrical cavity 28 has been formed in the pod 3 in order to expose the first and second electrical connections 9, 10 so that the integrated circuit 15 can be attached. The alternative shown in FIG. 8*a* may have only one lead-through 8 as explained in connection with FIGS. 4 and 6.

FIG. 8*b* shows a pod 3 that comprises an integrated circuit 15 in the middle of the pod 3. A cylindrical cavity 28 has been formed in the pod 3 in order to expose the first and second electrical connections 9, 10 so that the integrated circuit 15 can be attached. The alternative shown in FIG. 8*b* may have two lead-throughs 80*a*, 80*b* as explained in connection with FIGS. 5 and 7.

FIG. 8*c* shows a pod 3 that comprises an integrated circuit 15 in the middle of the pod 3. A cubical cavity 28 has been formed in the pod 3 in order to expose the first and second electrical connections 9, 10 so that the integrated circuit can be attached. The alternative shown in FIG. 6*c* may have two lead-throughs 80*a*, 80*b* as explained in connection with FIG. 5.

FIG. 9 shows a radiating antenna 2 from above. The radiating antenna 2 is a folded planar antenna than can be used instead of the helical radiating antenna 2 that is shown in FIGS. 1 and 2. The radiating antenna 2 has a coupling area 4 for the pod 3. The coupling area 4 comprises helices but otherwise the antenna is planar, i.e. it extends in a two-dimensional plane. FIG. 9 also shows pitches p1 and p2 in connection with the folded planar antenna.

FIGS. 10 and 11 show the principle of the folded planar antenna of FIG. 9 outside the coupling area 4. The folded planar antenna of FIG. 9 outside the coupling area 4 contours shapes of circles. The circles are in two parallel straight rows at regular intervals in such a manner that every other circle is in the first row and every other circle is in the second row. Each circle has radius r. Distance a is a distance between the midpoints of the circles in the first and second row. Distance b is a distance between the midpoints of the sequential circles in the longitudinal direction L of the antenna. Different antenna shapes may be achieved by changing at least one of the radius r, distance a or distance b.

Figure 12:
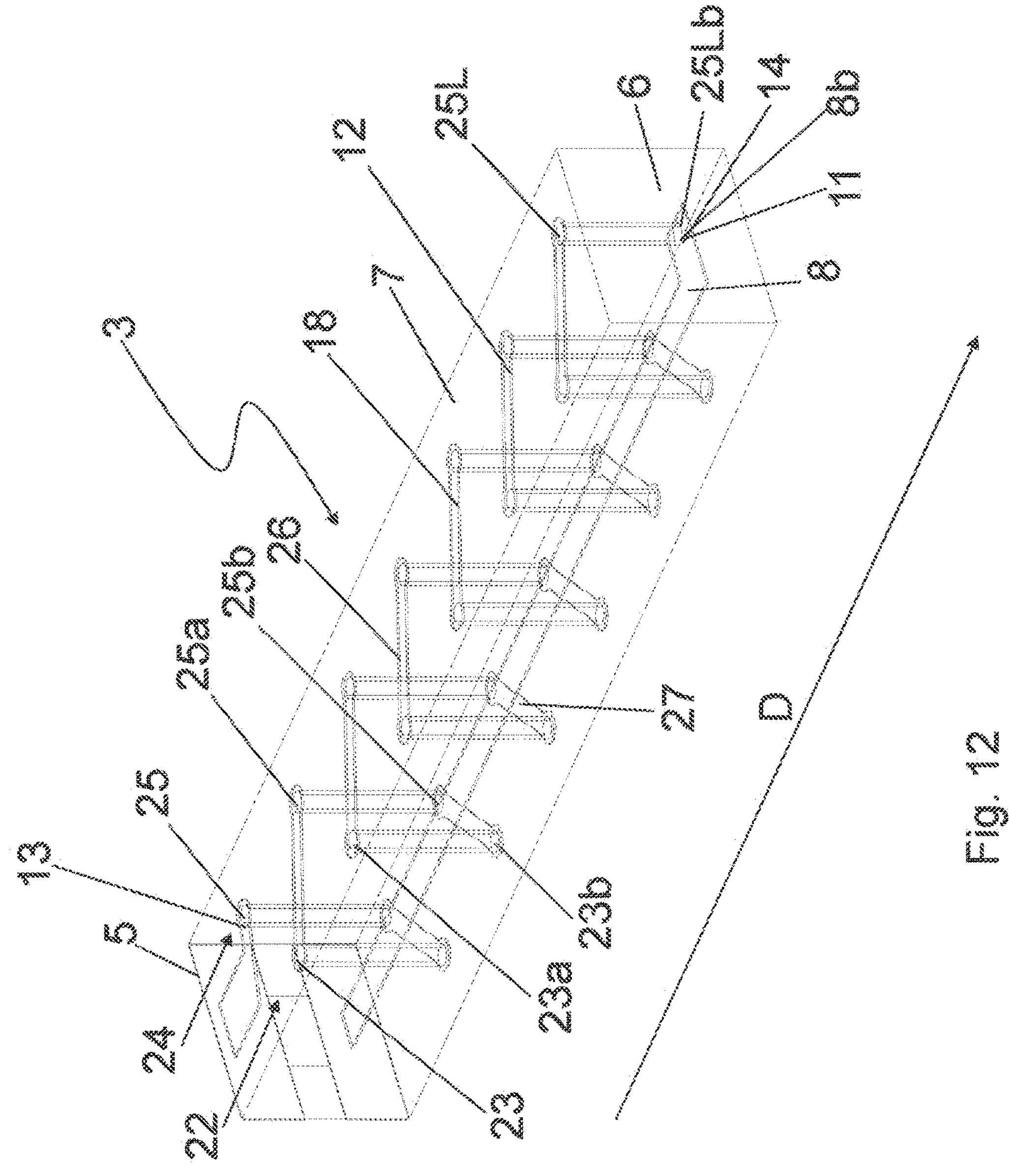
FIG. 12 shows a perspective view of a pod.
Figures 13, 14, 15:
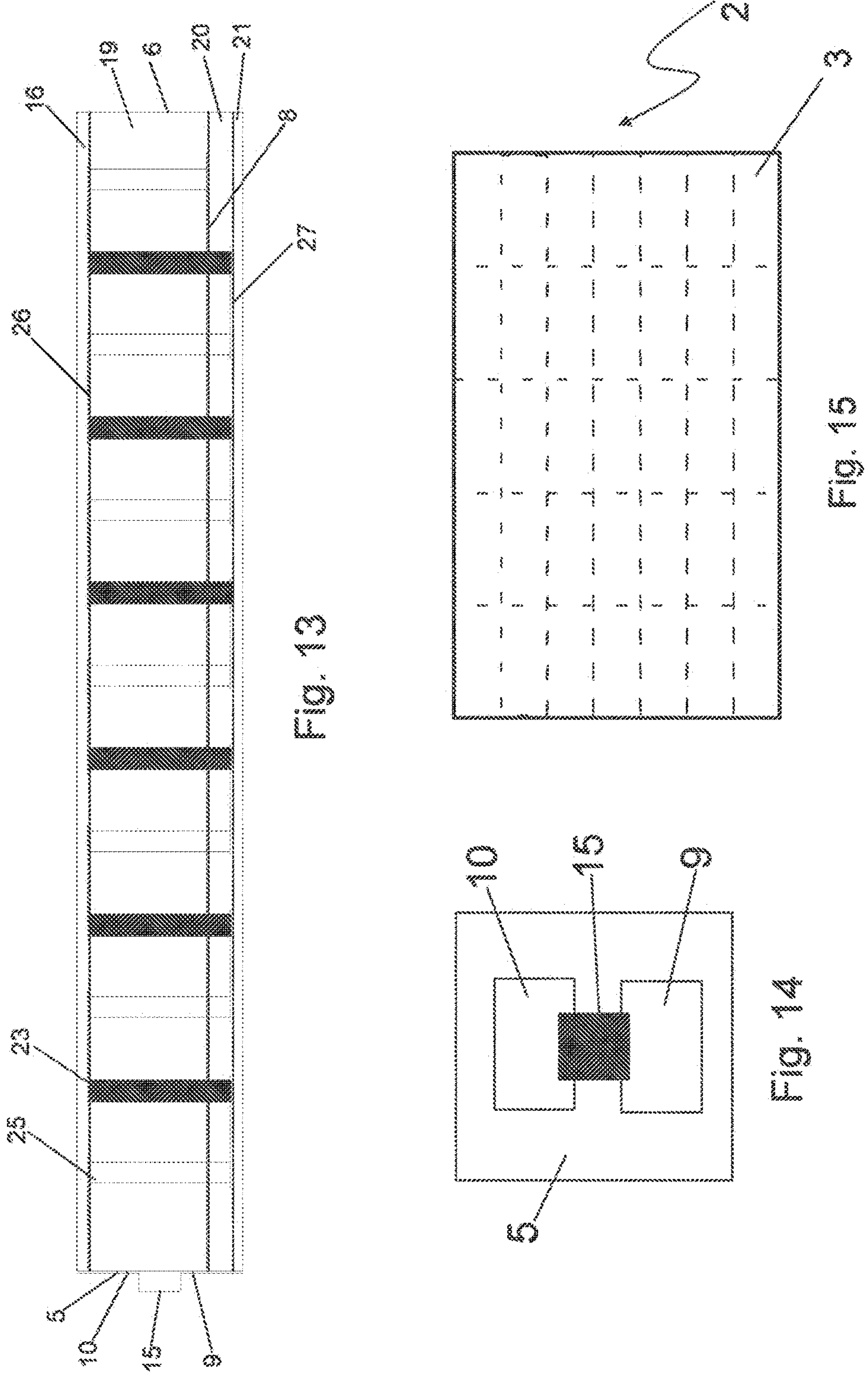
FIG. 13 shows a side view of a pod.
FIG. 14 shows a first end of a pod.
FIG. 15 shows a schematic view of a panel from above.

FIGS. 12 and 13 show a pod 3. The pod 3 comprises a first end 5 and a second end 6 and a casing 7 having a layered structure between the first end 5 and the second end 6. At least part of the casing 7 is of dielectric material.

The layered structure comprises a lead-through 8 between the first end 5 and the second end 6. The lead-through 8 may be a printed lead or another electrically conductive bridge. The first end 5 of the casing comprises a first electrically conductive connection 9 and a second electrically conductive connection 10.

A helical primary antenna 12, such as a planar helix antenna, resides in the casing 7. The helical primary antenna 12 has a first antenna end 13 and a second antenna end 14. A third electrically conductive connection 11 is configured to extend from the second antenna end 14. The first antenna end 13 is connected to the second electrically conductive connection 10. The second antenna end 14 is connected to the third electrically conductive connection 11. The third electrically conductive connection 11 is connected to the first electrically conductive connection 9 through the lead-through 8. An integrated circuit on a chip 15 is coupled to the first electrically conductive connection 9 and the second electrically conductive connection 10. The techniques, which are used for attaching the chip 15, may be direct soldering or wire bonding. An example of the first end 5 is shown in FIG. 14.

The casing 7 comprises layers of dielectric material, such as ceramic material. The casing comprises a first layer 19 and a third layer 21 and a second layer 20 between the first layer 19 and the third layer 21. Each layer may be a planar layer having a substantially constant thickness. The thickness may vary in different layers. Besides the above-mentioned layers there may be more layers. There may be at least one ceramic layer between the first and the second layer, and/or between the second and the third layer. There may also be at least one ceramic layer upon the first layer 19 and/or below the third layer 21. FIG. 13 shows a ceramic layer 16 on the first layer 19.

The casing comprises a first row 22 of sequential first via holes 23 that extend from the first layer 19 to the third layer 21. The first via holes 23 have first ends 23*a* and second ends 23*b*. The casing 7 also comprises a second row 24 of sequential second via holes 25 that extend from the first layer 19 to the third layer 21. The second via holes 25 have first ends 25*a* and second ends 25*b*. The via holes 25 in the second row 24 are at different points in the longitudinal direction of the casing 7 compared to the via holes 23 in the first row 22.

Sequential upper arms 26 connect the first ends 23*a* of the first via holes 23 to the first ends 25*a* of the second via holes 25 and sequential lower arms 27 connect the second ends

23*b* of the first via holes 23 and the second ends 25*b* of the second via holes 25. The arms 26, 27 and the via holes 23, 25 are electrically conductive. The arms 26, 27 extend diagonally in respect of the longitudinal direction of the pod. The arms 26, 27 cross in a projection perpendicular to the plane of the layers 19, 20, 21. The arms 26, 27 may be perpendicular to each other in the projection.

The last via hole 25L in the longitudinal direction D of the casing 7, which may be in either row 22, 24, extends from the first layer 19 to the second layer 20. The second end 25Lb of the last via hole 25L and the second end 8*b* of the lead-through 8 form the third electrically conductive connection 11. The first electrically conductive connection 9 extends from the first end 8*a* of the lead-through 8 towards the first end 5 of the pod 3. The second electrically conductive connection 10 extends from the first end 23*a* of the first via hole 23 towards the first end 5 of the pod 3. The integrated circuit on a chip (IC) 15, which is placed on the first end 5 of the pod 3, is coupled to the first electrically conductive connection 9 and the second electrically conductive connection 10. One suitable material for the antenna and the electrically conductive connections is silver. The electrically conductive connections may be electroplated with tin or other suitable material.

Thus, the helical primary antenna, which is a planar helix antenna in this case, is formed according to the second embodiment as follows: There are the electrically conductive via holes 23, 25 and the electrically conductive arms 26, 27. The antenna extends repeating a sequence from the first end 25*a* of the via hole 25 to the second end 25*b* of the via hole 25, from the second end 25*b* of the via hole 25 to the arm 27, from the arm 27 to the second end 23*b* of the via hole 23, from the second end 23*b* of the via hole 23 to the first end 23*a* of the 23, from the first end 23*a* of the via hole 23 to the arm 26 and from the arm 26 to the first end 25*a* of the via hole 25. It is also possible that the sequence begins from the other row, i.e. the via hole 23 is the first in the sequence.

The structure of the pod 3 may vary in respect of the order of the layers 19, 20, 21, i.e. the layers 19, 20, 21 may swap places. The second layer 20 may not include the lead-through 8. The lead-through 8 may be above the first layer 19, or under the third layer 21. Naturally, the electrically conductive connections 9, 10, 11 shall be redeployed in those cases. For example, the last via hole 25L may extend through the third layer 21 to the layer under the third layer 21 where the lead-through 8 extends. It is also possible that the second layer 20 is omitted. However, the second layer 20 between the first layer 19 and the third layer 21 is preferred in order to achieve the best inductance (coupling performance) to the radiating antenna 2.

The pod 3 may also be manufactured of two layers 19, 21. The second layer 20 may be omitted if the lead-through 8 is on the third layer 21. The lead-through 8 may be formed on the third layer between the via holes 23, 25. The lead-through 8 shall be electrically isolated from the via holes 23, 25. The above-mentioned option may also comprise at least one additional layer, such as a layer above the first layer 19, or a layer under the third layer 21.

The structure may also vary in respect of the placing of the chip 15. Instead of having the chip 15 on the first end 5 of the pod 3 it may be placed on anywhere on the outer surface of the pod 3. The electrically conductive connections 9, 10, 11 shall be redeployed accordingly. However, the first end 5 of the pod 3 is the preferred choice.

The preferred shape of the pod 3 is a rectangular prism. The rectangular prism may have a square cross-section perpendicular to its longitudinal axis, i.e. its side lengths in the height and depth direction are equal.

FIG. 15 shows a schematic view of a panel 29. The panel 29 comprises sequential and/or parallel pods 3 that are cut off after other phases of the manufacture have been accomplished.

Figure 16:
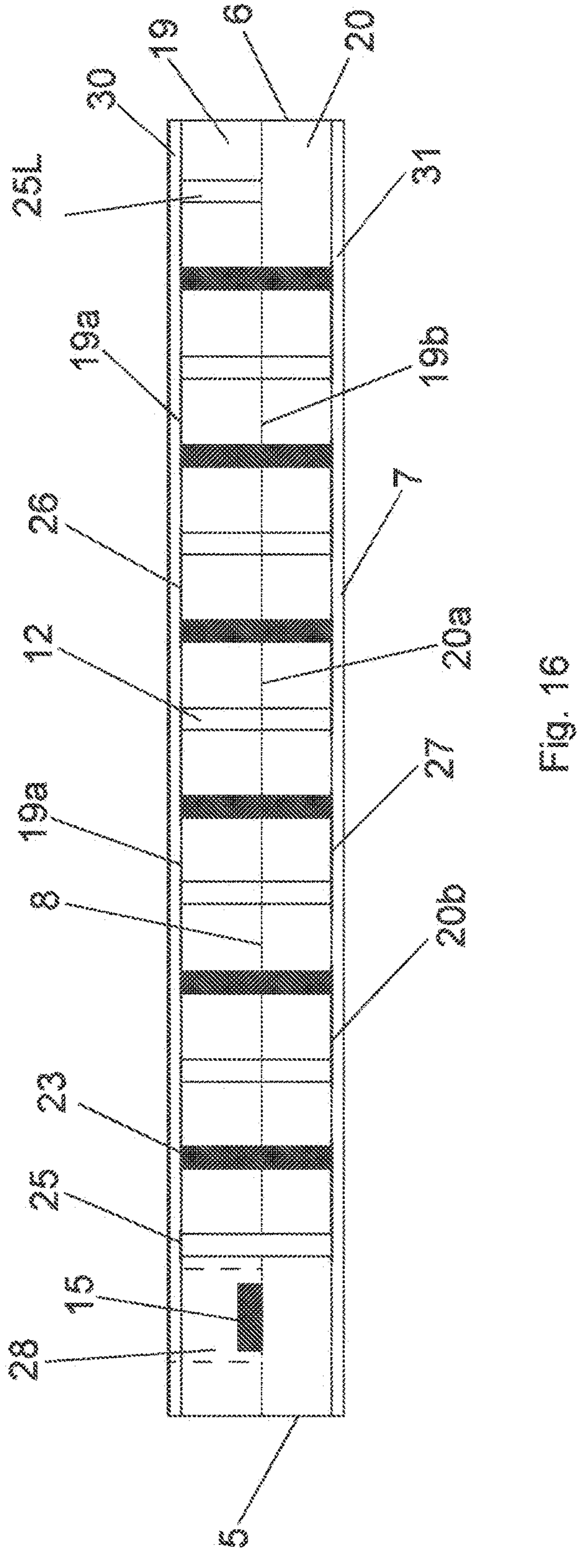
FIG. 16 shows a side view of a pod.

FIG. 16 shows a side view of a pod 3 that comprises a printed circuit board (PCB) core and a prepreg as first and second dielectric layers 19, 20. The technical contents disclosed in connection with the pods that comprise ceramic layers is directly applicable to the pod of FIG. 16 to the appropriate extent.

The PCB core has upper and lower surfaces 19*a*, 19*b*. The prepreg 20 has upper and lower surfaces 20*a*, 20*b*.

Via holes 23, 25 have been drilled through the layers 19, 20. Upper arms 26 have been formed on the upper surface 19*a* of the PCB core 19. Lower arms 27 have been formed on the lower surface 20*b* of the prepreg 20. A lead-through 8 have been formed on the lower surface 19*b* of the PCB core 19. An integrated circuit on a chip 15 has been connected to a first electrically conductive connection 9 and a second electrically conductive connection 10.

The pod 3 according to FIG. 16 have been separated from a panel 29 that comprises sequential and/parallel pods 3 as shown in FIG. 15. Each pod 3 of the panel 29 are manufactured at the same time. Each pod 3 may be manufactured as follows:

The dielectric PCB core 19 has an electrically conductive layer on both sides 19*a*, 19*b*. The electrically conductive layers may be of copper. A photoresist dry film comprising a circuit pattern is laminated by heat on both electrically conductive layers 19*a*, 19*b*. The film is thereafter removed but the circuit pattern remains on the electrically conductive layer, i.e. the circuit pattern on the upper surface 19*a* of the first layer 19 comprises a pattern for the upper arms 26 and the circuit pattern on the lower surface 19*b* of the first layer 19 comprises a pattern for the lead-through 8. The electrically conductive layers are etched so that only the circuit pattern remains on the upper and lower surfaces 19*a*, 19*b*. A cavity 28 is formed by drilling a hole to the PCB core 19. The cavity 28 exposes the first electrically conductive connection 9 and the second electrically conductive connection 10 so that the chip 15 can be attached.

The prepreg 20 is laminated to the PCB core 20 in such a manner that the lower surface 19*b* of the first layer 19 and the upper surface 20*a* of the second layer 20 contact. A foil of electrically conductive material, such as copper, is laminated to the lower surface 20*b* of the prepreg 20. The foil may be attached by a vacuum lamination press.

Thereafter the via holes 23, 25 are formed. The via holes 23, 25 may be formed by a CNC PCB drilling machine. The via holes 23, 25 are electroplated in order to make them electrically conductive.

A photoresist dry film comprising a circuit pattern is laminated by heat on the lower surface 20*b* of the prepreg 20. The film is thereafter removed but the circuit pattern remains on the electrically conductive foil, i.e. the circuit pattern on the lower surface 20*b* of the second layer 20 comprises a pattern for the lower arms 27. The electrically conductive foil is etched so that only the circuit pattern remains on the lower surface 20*b*. Layers 30, 31 of a solder mask are applied on the upper surface 19*a* of the first layer 19 and the lower surface 20*b* of the second layer 20 in order to protect the upper and the lower surface of the pod 3.

The integrated circuit on the chip 15 is fixed in the cavity 28 by using die attach adhesive. The first electrically conductive connection 9 and the second electrically conductive connection 10 are connected to respective pads of the chip 15 by a wire bonding method. Thereafter the cavity 28 may be filled with a resin that protects the chip 15, such as epoxy.

It will be obvious to a person skilled in the art that, as the technology advances, the inventive concept can be implemented in various ways. The invention and its embodiments are not limited to the examples described above but may vary within the scope of the claims.

The invention claimed is:

1. An RFID transponder, comprising:

a radiating antenna and a pod, the radiating antenna having a coupling area for the pod, wherein:

the pod is situated at the coupling area, and the pod comprises a first end and a second end and a casing between the first end and the second end, at least part of the casing comprising dielectric layers one above the other, upper arms on a surface of one of the dielectric layers, lower arms on a surface of another layer of the dielectric layers, and via holes connecting the upper and lower arms form a planar helix antenna that is configured to extend between the first end and the second end, the planar helix antenna has a first antenna end and a second antenna end, the first antenna end is connected to a second electrically conductive connection and the second antenna end is connected to a first electrically conductive connection, an integrated circuit on a chip is coupled to the first electrically conductive connection and the second electrically conductive connection inside the pod, a lead-through is configured to run between the upper arms and the lower arms on a surface of one of the dielectric layers, at least the first electrically conductive connection is electrically connected to the second antenna end or the second electrically conductive connection is electrically connected through the lead-through to the first antenna end, and the radiating antenna and the planar helix antenna are configured to couple without a physical contact.

2. The RFID transponder according to claim 1, wherein the radiating antenna and the planar helix antenna are configured to couple by inductive coupling.

3. The RFID transponder according to claim 1, wherein the radiating antenna is a three-dimensional helical antenna.

4. The RFID transponder according to claim 1, wherein the radiating antenna is a folded planar antenna.

5. The RFID transponder according to claim 1, wherein the radiating antenna comprises a helical coupling area.

6. The RFID transponder according to claim 1, wherein the pod is inside the helical coupling area.

7. A pod for an RFID transponder, the pod comprising a first end and a second end, and a casing between the first end and the second end, at least part of the casing comprising dielectric layers one above the other, wherein:

upper arms on a surface of one of the dielectric layers, lower arms on a surface of another layer of the dielectric layers, and via holes connecting the upper and lower arms form a planar helix antenna that is configured to extend between the first end and the second end, the planar helix antenna has a first antenna end and a second antenna end, the first antenna end is connected to a second electrically conductive connection and the second antenna end is connected to a first electrically conductive connection, an integrated circuit on a chip is coupled to the first electrically conductive connection and the second electrically conductive connection inside the pod, a lead-through is configured to run on a surface of one of the dielectric layers between the upper arms and the lower arms, and at least the first electrically conductive connection is electrically connected to the second antenna end or the second electrically conductive connection is electrically connected through the lead-through to the first antenna end.

8. The pod according to claim 7, wherein the first electrically conductive connection is electrically connected through a lead-through to the second antenna end.

9. The pod according to claim 7, wherein the second electrically conductive connection is electrically connected through a lead-through to the first antenna end.

10. The pod according to claim 7, wherein the first electrically conductive connection is electrically connected through a lead-through to the second antenna end and the second electrically conductive connection is electrically connected through a lead-through to the first antenna end.

11. The pod according to claim 7, wherein the lead-through is a printed lead.

12. The pod according to claim 7, wherein the pod comprises a cavity for the integrated circuit on the chip.

13. A pod for an RFID transponder, the pod comprising an outer surface and a first end, a second end, and a casing between the first end and the second end, at least part of the casing comprising dielectric layers one above the other, wherein:

upper arms on a surface of one of the dielectric layers, lower arms on a surface of another layer of the dielectric layers, and via holes connecting the upper and lower arms form a planar helix antenna that is configured to extend between the first end and the second end, the planar helix antenna has a first antenna end and a second antenna end, the first antenna end is connected to a second electrically conductive connection and the second antenna end is connected to a first electrically conductive connection, an integrated circuit on a chip on the outer surface of the pod is coupled to the first electrically conductive connection and the second electrically conductive connection, a lead-through is configured to run between the upper arms and the lower arms on a surface of one of the dielectric layers, and at least the first electrically conductive connection is electrically connected to the second antenna end or the second electrically conductive connection is electrically connected through the lead-through to the first antenna end.

* * * * *